INVENTORS
WILLIAM R. RAMSAY
JAMES J. SPILKER, JR.

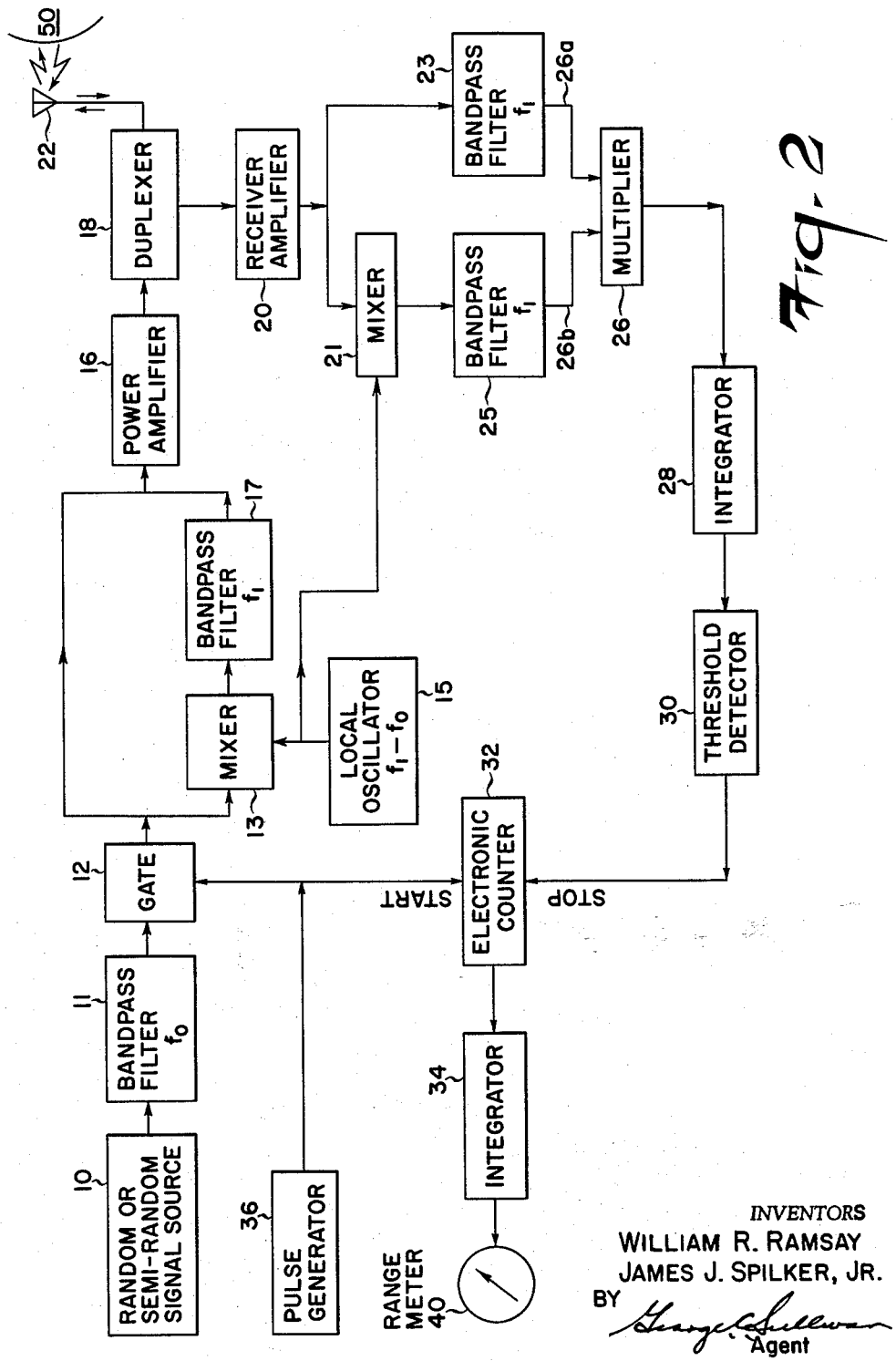

INVENTORS
WILLIAM R. RAMSAY
JAMES J. SPILKER, JR.
BY
Agent

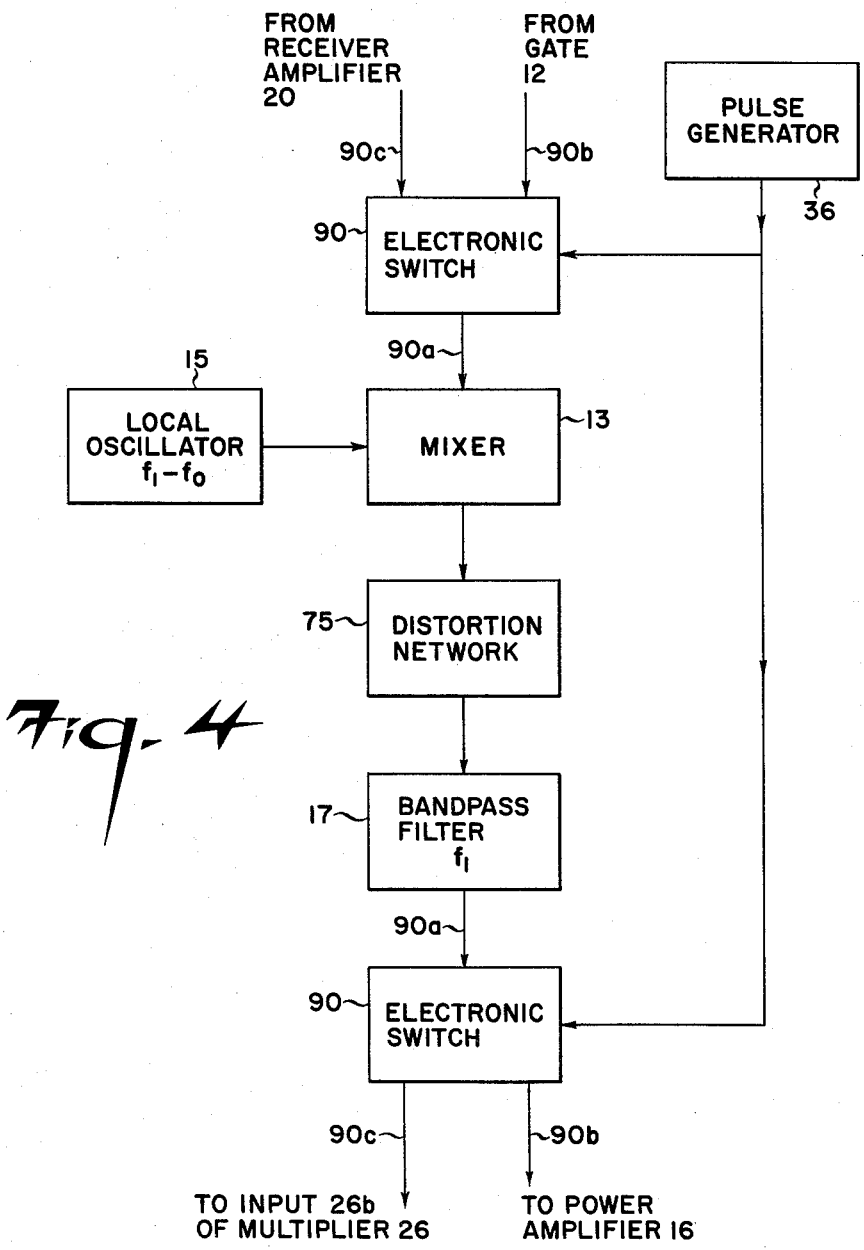

United States Patent Office 3,175,214
Patented Mar. 23, 1965

3,175,214
DOPPLER-FREE DISTANCE MEASURING SYSTEM
William R. Ramsay, Mountain View, and James J. Spilker, Jr., Palo Alto, Calif., assignors to Lockheed Aircraft Corporation, Burbank, Calif.
Filed Mar. 18, 1960, Ser. No. 17,730
7 Claims. (Cl. 343—13)

This invention relates to improved means and methods for obtaining a distance measurement by means of electromagnetic radiation.

The measurement of distance or range by means of electromagnetic radiation has had considerable use in the field of radar and other related applications requiring a distance measurement, such as in guided missiles and ordnance fuzing systems. In radar use, considerable difficulty has been involved in overcoming the errors introduced by the Doppler shift from any relative velocity which may be present between the radar and the target. Also, attempts are continually being made to improve the signal-to-noise ratio characteristics of the system so that operation is possible even in the presence of considerable amounts of interfering noise. In guided missile and ordnance fuzing applications, the requirements of a distance measuring system are further complicated by the desirability of achieving a high immunity to jamming as well as overall system simplictiy.

Accordingly, it is the broad object of this invention to provide a relatively simple distance measuring system employing electromagnetic radiation which is independent of Doppler, is capable of operating with a low signal-to-noise ratio and has a high immunity to jamming.

A more specific object of this invention is to provide a distance measuring system which is capable of providing an accurate measurement of distance even in the presence of large amounts of interfering noise.

A further object of this invention is to provide a distance measuring system which is capable of employing random energy as the carrier transmission signal.

Another object of this invention is to provide a distance measuring system which is capable of providing an accurate measurement of distance, regardless of the relative velocity between the system and a target.

Still another object of this invention is to provide a distance measuring system which is highly immune to jamming.

A further object of this invention is to provide a distance measuring system which can be adapted for use in a guided missile or an ordnance fuzing system.

An additional object of this invention is to provide the systems of the above-mentioned objects in relatively simple and compact form.

In a typical embodiment of the invention the above objects are accomplished by means of a system in which the transmitted electromagnetic signal comprises two random energy signals derived from a random energy signal source which have been made uncorrelated by separating the two signals in the time or frequency domain. When these two signals are received after reflecsion from a target, the time or frequency separation provided is eliminated so that the signals are again correlated. These correlated signals are then multiplied together and the multiplied output integrated to produce a signal which is delayed with respect to the transmitted signal by an amount proportional to the distance between the system and the target.

The specific nature of the invention, as well as other objects, uses and advantages thereof, will clearly appear from the following description and from the accompanying drawing in which:

FIG. 2 is a block diagram of another embodiment of a distance measuring system in accordance with the invention.

FIGS. 3 and 4 are block diagrams illustrating further modifications of the invention.

Like numerals designate like elements throughout the figures of the drawing.

Figure 1:
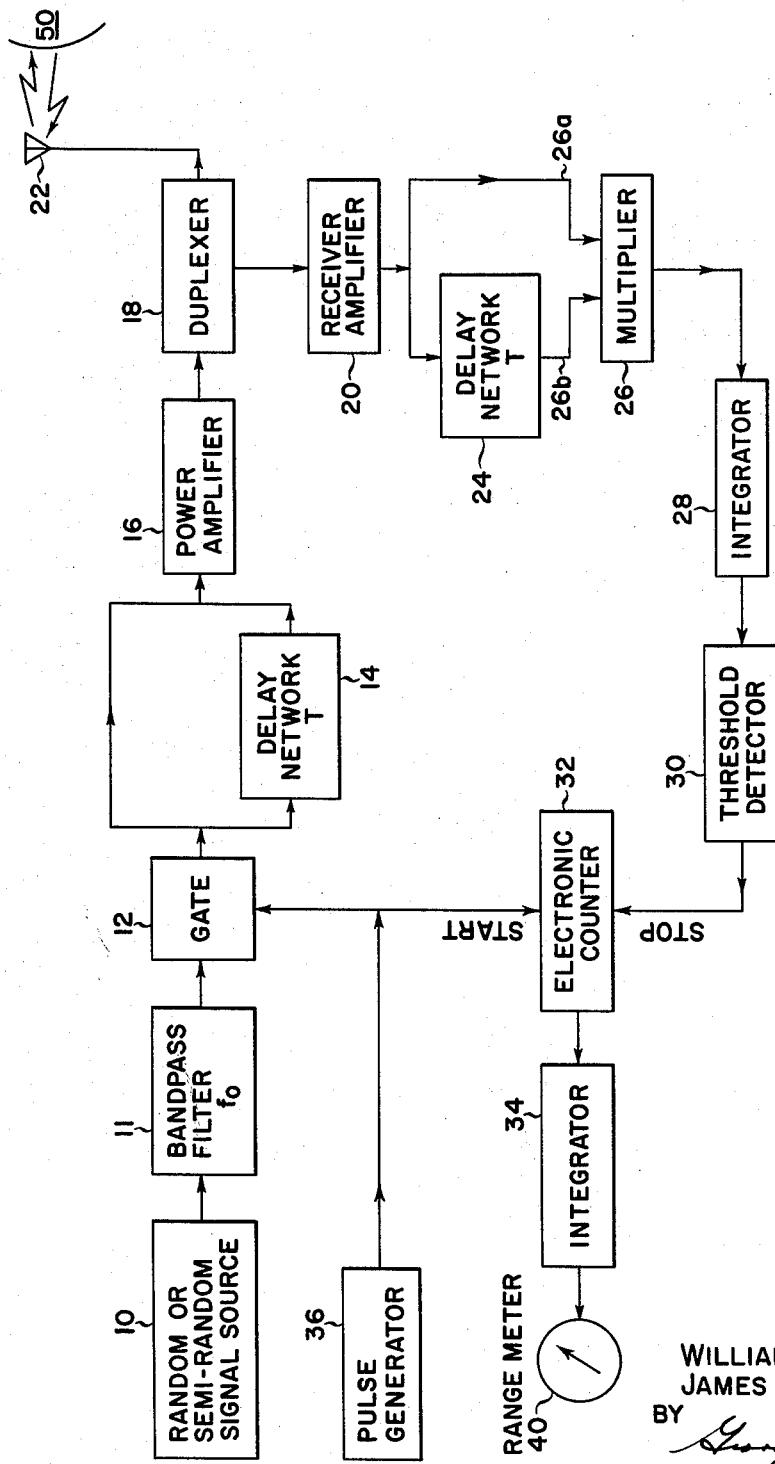
FIG. 1 is a block diagram of a distance measuring system in accordance with the invention.

In FIG. 1, a random or semi-random signal source 10 provides a signal which has some random characteristics associated with it. For example, the source 10 may provide a true random signal over a wide band obtained by amplifying thermal, shot or any other available random source, such as might freely be available in nature. Or, the signal from the source 10 may be a semi-random signal obtained by introducing some random variation into a periodic signal, such as by noise modulating a periodic oscillator. Such random and semi-random signals will hereinafter be referred to as non-periodic signals. The non-periodic signal obtained from the source 10 may be spread over a wide band and it is often desirable to restrict its bandwidth to a predetermined band of frequencies. This is accomplished by feeding the output of the source 10 to a bandpass filter 11 having a center frequency $f_0$ and a predetermined bandwidth. The bandwidth provided by the bandpass filter 11 is preferably relatively wide as compared to conventional communication channels employing periodic signals. The use of a wide bandwidth is important in determining the signal-to-noise ratio and in achieving a high immunity to jamming, as will hereinafter be shown.

The output from the bandpass filter 11 is therefore a non-periodic signal centered at $f_0$ and having a bandwidth determined by the bandpass filter 11. This signal is then fed to the input of a gate 12 which is periodically opened for a predetermined time by the output pulses fed thereto from a pulse generator 36, the width of the pulses from the generator 36 determining the predetermined time for which the gate 12 is open. Each output pulse from the pulse generator 36 is also fed to the start input of an electronic counter 32.

When the gate 12 is opened, a time portion of the output from the bandpass filter 11 passes through the gate 12 after which it is divided into two portions, a first portion being fed directly to a power amplifier 16 and the second portion being fed to the power amplifier 16 through a delay network 14 which provides a delay of T. Thus, for each pulse from the pulse generator 36, a first pulse corresponding to the output from the bandpass filter 11 is directly fed to the power amplifier 16, and an identical second pulse is fed to the power amplifier 16 T seconds later, the width of these pulses being the same as the width of the pulses from the pulse generator 36. The delay T should be chosen sufficiently large so that the first and second pulses will be substantially uncorrelated to a preselected degree in the time domain.

If the delay T provided by the delay network 14 is chosen to be greater than the width of the first and second pulses of non-periodic energy, it will be understood that these pulses will then be applied to the power amplifer 16 during separate periods of time without any overlapping. However if the delay T provided by the delay network 14 is chosen to be smaller than the width of the first and second pulses of non-periodic energy there will be some overlapping. Usually, for signal-to-noise ratio considerations, it is preferable that there be no overlapping, but in certain applications the provision of overlapping pulses may be desirable. The amplified first and second pulses obtained at the output of the power amplifier 16 are fed through a duplexer 18 to an antenna 22 for radiation to a target 50. The duplexer 18 may be of any well known type which permits the same antenna 22 to be used for both radiation and reception.

There will be radiated from the antenna 22, therefore, two substantially identical pulses of non-periodic energy, the second pulse being delayed from the first pulse by an amount T. The two pulses travel to the target 50, are reflected therefrom and travel back to the antenna 22 where they are picked up and passed through the duplexer 18 to a receiver amplifier 20 which amplifies the received pulses to a desired level. The output from the receiver amplifier 20 is divided into two portions, one portion being fed directly to one input 26a of a multiplier 26 and the other portion being fed through a delay network 24 to the other input 26b of the multiplier 26. The delay network 24 is chosen to provide the same delay T as the delay network 14.

It will be understood that the first pulse which was not previously delayed and which is now delayed by the delay network 24 on its way to the input 26b of the multiplier 26, and the second pulse which was originally delayed by the delay network 14 and now passes directly to the input 26a of the multiplier 26 will appear at these inputs of the multiplier 26 at the same time. Since these non-periodic signals are correlated, an appreciable output signal will be obtained from the multiplier 26 which can be integrated by an integrator 28 to provide a signal of sufficient magnitude to activate a threshold detector 30. When uncorrelated signals arrive at the multiplier 26, their power tends to integrate out to zero and the threshold detector 30 can easily be designed to ignore the relatively small output from the integrator 28 for uncorrelated signals or noise. Thus, the out-of-time first and second pulses which are applied to the multiplier 26, or any interfering noise will be uncorrelated and effectively integrate out to zero. It will be appreciated, therefore, that pulses reflected from a target can be detected even in the presence of large amounts of interfering noise.

Typical types of multipliers which may be used as the multiplier 26 in FIG. 1 are described in "Block Modulation Theory," by D. van Nostrand, pp. 145–148, and "Communication Theory" by W. Jackson, pp. 200–202. The integrator 28 may be of conventional design and a low pass filter will suffice in many applications. Where fast recovery time is desired, specially designed integrators such as are used in radar systems may also be employed. The threshold detector 30 may be any of a number of well known circuits which are capable of producing an output pulse when the input applied thereto reaches a predetermined magnitude. Thus, it is seen that delay network 24, multiplier 26, integrator 28, and threshold detector 30 coact to produce a pulse each time signals are received which are uncorrelated to the preselected degree caused by delay network 14. The delay network 24 acts to recorrelate the signal at its input such that the signals at terminals 26a and 26b are correlated.

When the threshold detector 30 is activated it produces a pulse which is applied to stop the electronic counter 32. The electronic counter 32 may be a pulse generator which is adapted to begin oscillating when it receives a pulse from the pulse generator 36 and stop oscillating when a pulse is received from the threshold detector 30. Thus, the output from the electronic counter 32 for each radiated pair of pulses will be a plurality of pulses whose number is dependent upon the distance between the system and the target 50. These pulses may be employed to give distance data in a variety of ways, including displaying the information on a conventional type of radar scope.

A simple manner for obtaining distance information is illustrated in FIG. 1 in which the output pulses from the electronic counter 32 are fed to an integrator 34. The output of the integrator 34 will be a signal having an average value proportional to the number of pulses provided by the electronic counter 32 for each cycle of operation. An averaging meter 40 may thus be connected to receive the output from the integrator 34 in order to provide an indication of target distance.

It will be evident that the repetition rate of the pulse generator 36 determines the repetition rate of the system, the system cycling once for each pulse provided by the pulse generator 36. The repetition rate of the pulse generator 36 should be chosen so that it is at least larger than the delay T plus the delay due to the maximum distance to be measured.

From the above description, various important features of the system will now become evident. First, because detection is obtained by multiplying correlated pulses and then integrating, detection of these pulses is possible even in the presence of large amounts of interfering noise, since uncorrelated signals tend to average out to zero after integration. Secondly, because both transmitted pulses receive the same Doppler shift (which may result from relative velocity between the system and the target 50), Doppler will have no effect upon the operation of the system, and there will be no need to provide velocity search as is necessary in conventional types of radar systems.

Another feature of the system which can be of great importance in some situations is that the system permits any sort of non-periodic energy such as might appear in nature to be used as the carrier, and there is no need to generate large amounts of periodic energy which is sometimes most difficult to accomplish, particularly at very high microwave frequencies. The use of a non-periodic signal is additionally important in order that the outputs obtained from the integrator 28 for correlated and uncorrelated signals be easily recognizable. Theoretically, periodic signals could be employed, but the result would not be as advantageous as when using a random or semi-random signal, because periodic signals will correlate to some extent with a wide variety of signals and will make jamming considerably easier. Also, the use of a periodic signal would introduce ambiguity problems. However, it is possible that there may be some benefit in using such periodic signals in certain specialized applications and the present invention is intended to include the use of such a periodic signal in the system of FIG. 1 and the other systems to be described.

The use of a non-periodic signal in deriving the pulses to be transmitted has the further advantage that a relatively wide band random signal can conveniently be obtained by suitable choice of the bandwidth of the band-pass filter 11. The wide band pulses radiated may then be received with small signal-to-noise ratios, and yet be demodulated with high signal-to-noise ratios. Also, the provision of a relatively wide band non-periodic signal which is transmitted as described in connection with FIG. 1 is advantageous in that it is very difficult to jam, because of the wide range of jamming frequencies which must be provided and the small possibility that they will be sufficiently correlated to affect system operation.

Where the delay provided by the delay network 14 is less than the pulse width provided by the pulse generator 36, the first and second radiated pulses will overlap so that the resultant radiated energy will appear as a pulse which exists for some finite period of time. The delay between the two radiated pulses will thus be entirely indistinguishable. Those skilled in the art will realize that this masking of the delay between pulses makes jamming even more difficult for, if the two pulses were distinguishable, it is conceivable that an enemy could determine the delay and radiate back pulses which are suitably delayed so as to be correlated in the multiplier 26. Where a high immunity to jamming is required, therefore, overlapping pulses are most advantageous. However, as mentioned previously, it is preferable that the delay provided by the delay network 14 be greater than the width of the pulses provided by the pulse generator 36 in order to obtain a better signal-to-noise ratio, and the achieving of a high signal-to-noise ratio may be of primary importance in some applications.

Figure 1A:
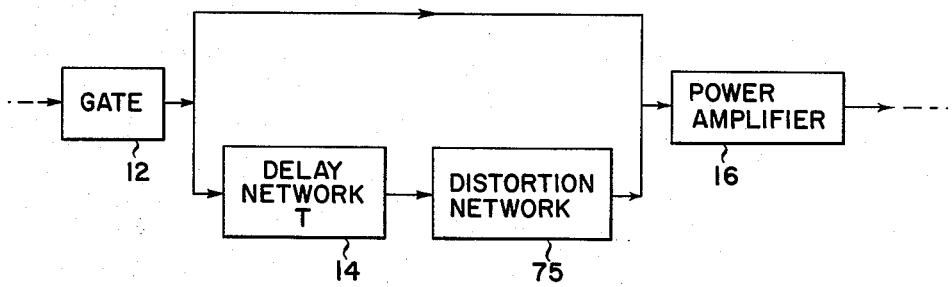
FIGS. 1A and 1B are block diagrams indicating how the embodiment of FIG. 1 can be modified to achieve a greater immunity to jamming.
Figure 1B:
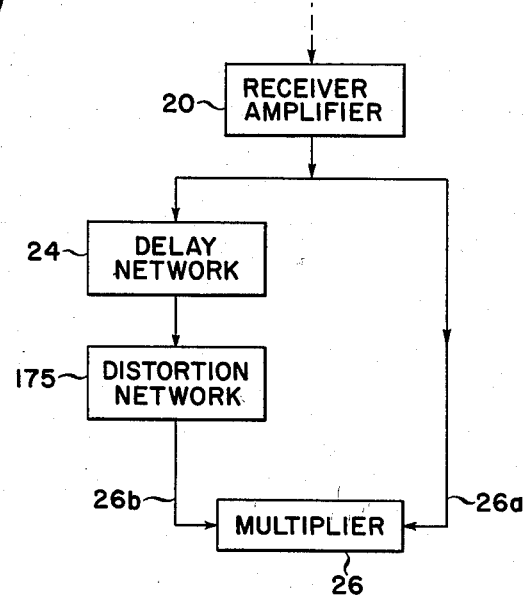

In order to permit the system of FIG. 1 to be operated so that the radiated pulses do not overlap and the high immunity to jamming provided by the overlapping pulse arrangement is retained, the modifications illustrated in FIGS. 1A and 1B may be provided. As shown in FIG. 1A, a distortion network 75 is introduced in series with the delay network 14 between the output of the delay network 14 and the power amplifier 16. The distortion network 75 is chosen so that it distorts the signal passing therethrough in a predetermined manner, such as might be provided by a frequency-sensitive network which distorts the frequency response of the signal passing therethrough. In other words, the output of gate 12 and the output of distortion network 75 will be uncorrelated with one another to a preselected degree which degree is a function of the delay time T of network 14 and the amount of distortion caused by network 75. Such distortion networks as 75 in FIG. 2A have been employed in secrecy communication systems of the prior art and may readily be provided. One example of such a distortion network is a delay line in series with a summing circuit. The delay line has a plurality of half points along the length thereof, each such point providing a different time delay in the frequency spectrum of the incoming signal. These delayed versions of the incoming signal are received by the summing circuit which produces a composite signal and delayed versions of the incoming signal. Another example of the distortion network consists of a frequency spectrum dividing circuit, a plurality of associated local oscillators, and a summing circuit. An incoming signal is divided into a plurality of frequencies, each of which is heterodyned with the output of its associated local oscillator. These heterodyned signals are fed into the summing circuit which produces a composite signal having frequency components shifted in an order different from the incoming signal.

By providing the distortion network 75, it will be understood that although the delay between the two transmitted pulses will be recognizable, an unwanted listener will be unable to generate a suitable jamming signal without knowing the distortion that has been introduced by the distortion network 75.

In FIG. 1B, a substantially identical distortion network 175 is introduced in series with the delay network 24 between the output of the delay network 24 and the input 26b to the multiplier 26. Thus, correlated signals which have been delayed and distorted in an identical manner will appear at the inputs to the multiplier 26 at the same time, and when multiplied and integrated produce an output signal which will activate the threshold detector 30 to stop the counter 32.

It should be noted that since the correlated pulses appearing at the inputs to the multiplier 26 will be delayed by an amount T as a result of each pulse being delayed by T, the electronic counter 32 will run for a time T longer than the time due to the delay in transit of the pulses between the system and the target 50. The meter 40 or any other type of display devices employed should be calibrated to take this additional delay T into account. Alternatively, to eliminate the delay T from the distance measurement, the delayed pulses from the output of the delay network 14 could be used to start the electronic counter 32 instead of employing the output pulses from the pulse generator 36.

In the system of FIG. 1 separation between the two radiated pulses is provided by delaying one signal with respect to the other. It is also possible to separate the two signals by heterodyning one of the pulses to a different non-overlapping frequency band, as illustrated in the system of FIG. 2. In the transmitter portion of FIG. 2 the delay network 14 is removed and substituted therefore is a mixer 13, a local oscillator 15 producing a sinusodial signal at a frequency $f_1$–$f_0$, and a bandpass filter 17.

As in FIG. 1, the pulsed output from the gate 12 is a non-periodic signal centered at $f_0$ and having a bandwidth determined by the bandwidth of the bandpass filter 11. Also, as in FIG. 1, the output of the gate 12 is divided into two portions, one portion being fed directly to the power amplifier 16. In the system of FIG. 2, the other portion is not delayed as in FIG. 1, but instead is heterodyned in the mixer 13 with the sinusodial signal of frequency $f_1$–$f_0$ obtained from the local oscillator 15. The heterodyned output is fed to the power amplifier 16 through the bandpass filter 17 which is centered at the frequency $f_1$ and has a bandwidth sufficient to pass only the heterodyned sum of the mixer output. There will be radiated to the target 50, therefore, two pulses occurring at the same time, but existing in two non-overlapping frequency bands centered at $f_0$ and $f_1$ respectively. Thus, the two pulses will be uncorrelated with one another to a pre-selected degree which degree is a function of the frequency $f_1$–$f_0$ of oscillator 15.

The reflected pulses from the target 50 are picked up by the antenna 22 and pass to the receiver amplifier 20 through the duplexer 18 as in the system of FIG. 1. The two pulses are now separated and returned to the same frequency band as follows. One portion of the output of the receiver amplifier 20 is fed to the input 26a of the multiplier 26 through a bandpass filter 23 centered at the frequency $f_1$. The bandpass filter 23 has a bandwidth sufficient to pass the second pulse which has been heterodyned to a band centered at $f_1$, but insufficient to pass the first pulse in the band centered at $f_0$. Consequently, only the second pulse centered at the frequency $f_1$ is applied to the input 26a of multiplier 26.

The other portion of the output from the receiver amplifier 20 is first fed to a mixer 21 where it is heterodyned with the sinusoidal output signal from the local oscillator 15 and then fed to a bandpass filter 25 which may be the same as 23. The mixer 21, the local oscillator 15 and the bandpass filter 25 perform the same operation on the first pulse as the mixer 13, the local oscillator 15 and the bandpass filter 17 performed on the second pulse. Thus, when the second pulse centered at the frequency $f_1$ is applied to the input 26a of the multiplier 26, the first pulse heterodyned to the same band as the second pulse and also centered at the frequency $f_1$ is simultaneously applied to the other input 26b of the multiplier 26. Since these two pulses are correlated, the multiplication and integration thereof produces an appreciable signal to activate the threshold detector 30 and thereby stop the counter 32. As before, uncorrelated signals tend to integrate out to zero.

As in the system of FIG. 1, the number of pulses which the electronic counter 32 generates between the start and stop period is proportional to the distance between the system and the target 50. However, because no delay between pulses is involved, except that due to transit of the radiated pulses to and from the target, the count of the counter 32 will be a direct indication of target distance.

Figure 2A:
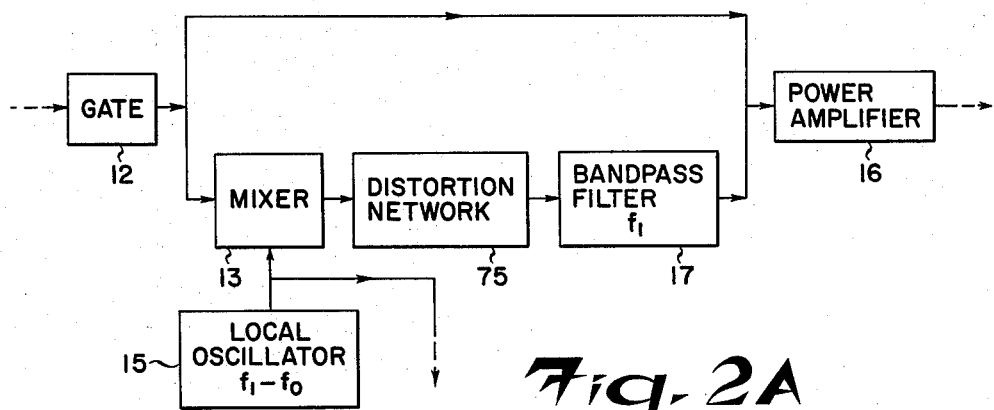
FIGS. 2A and 2B are block diagrams indicating how the embodiment of FIG. 2 can be modified to achieve a greater immunity to jamming.
Figure 2B:
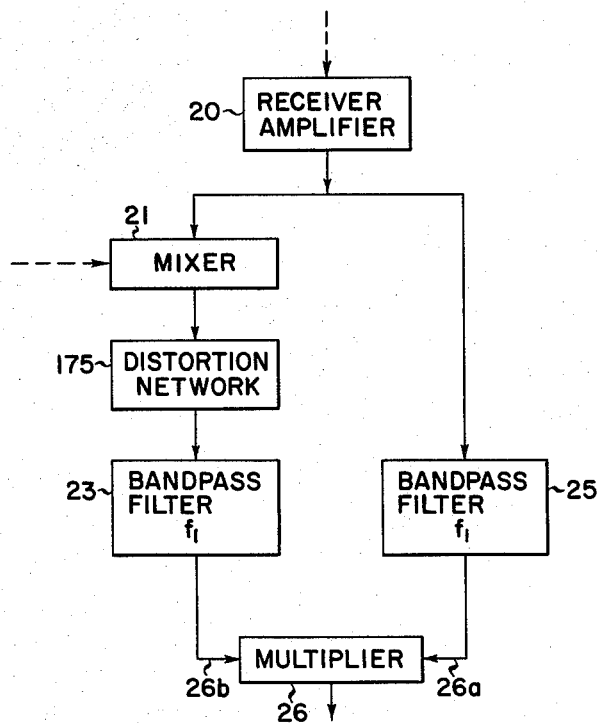

Those skilled in the art will appreciate that a spectrum analyzer will be capable of separating the radiated pulses into two separate frequency bands, and by so doing determine the frequency difference therebetween. It may be possible, therefore, to produce jamming pulses obtained from the radiated pulses which would successfully interfere with the operation of the system, in an analogous manner as described in connection with FIG. 1. In order to prevent this possibility, greater immunity to jamming is provided for the system of FIG. 2 in the same way as was provided in FIGS. 1A and 1B for the system of FIG. 1. This is illustrated in FIGS. 2A and 2B where the distortion networks 75 and 175 are respectively provided between the mixer 13 and the bandpass filter 17 in the transmitter portion, and between the mixer 21 and the bandpass filter 23 in the receiver portion. The distortion network 75 distorts the second pulse while the distortion network 175 distorts the first pulse in a substantially identical manner. Consequently, when the two pulses simultaneously appear in the same band at the inputs 26a and 26b of the multiplier 26 as described in connection with FIG. 2, they will both have received the same distortion and therefore will be correlated. Upon multiplication and integration, the threshold detector 30 will be activated and the counter 32 stopped as described previously.

It will be understood that although the frequency bands of the two radiated pulses are determinable, an enemy could not provide a suitable jamming signal without knowing the distortion introduced by the distortion network 75. Even greater immunity in the systems of FIGS. 1 and 2 as modified by FIGS. 1A, 1B and 2A, 2B, respectively, can be obtained by slowly or periodically varying the distortion networks 75 and 175 in an identical manner so that the enemy has no way of knowing what the distortion might be. Obviously, the distortion networks must remain substantially constant for each cycle so that the radiated and received pulses can be identically distorted.

Instead of using the systems of FIGS. 1 and 2 strictly as distance measuring systems, it is possible to employ these systems to detonate a missile at a predetermined distance above the ground or from a target. For such use a conventional type of firing circuit and detonator could be substituted for the meter 40 so that when the output of the integrator 34 reaches a predetermined magnitude corresponding to a desired distance from the target, the firing circuit will be activated and the detonator energized to detonate the missile warhead.

Figure 3:
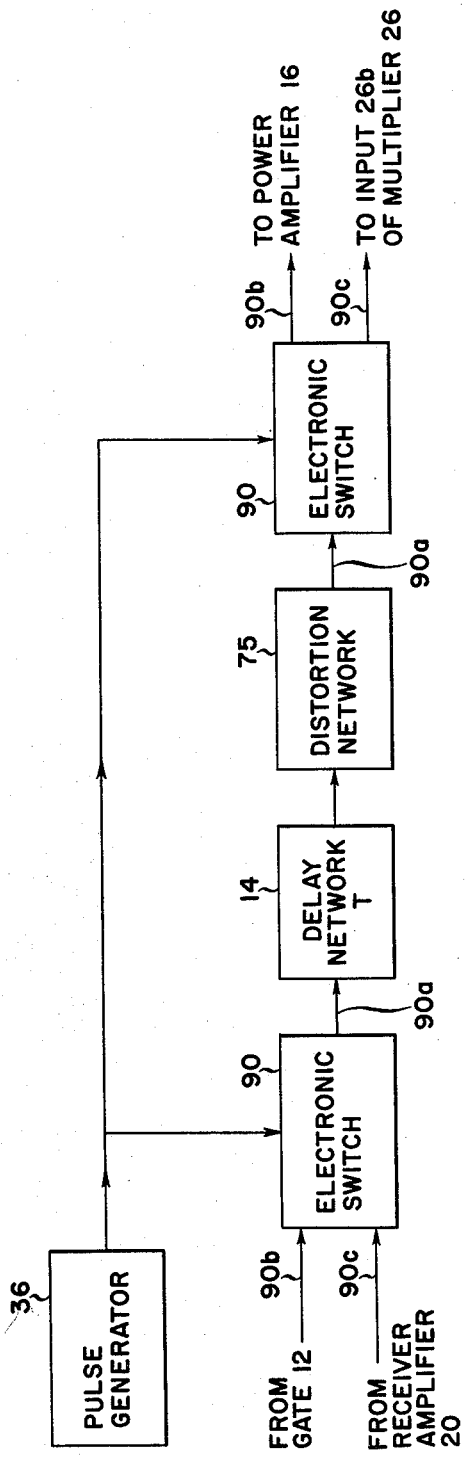

In many instances, it will be desirable to use the same separating circuitry and distortion networks in both the transmitter and receiver portions of the system so as to eliminate the necessity of providing identical circuitry and networks in both portions. Also, the use of the same circuitry and networks makes it much more convenient to vary the characteristics of the distortion network for greater jamming immunity. FIGS. 3 and 4 show how electronic switches 90 may be employed to permit the same separating circuitry and distortion networks to be used in both transmitter and receiver portions of the systems of the systems of FIGS. 1 and 2 as modified by FIGS. 1A, 1B and 2A, 2B, respectively.

Single-pole, double-throw electronic switches such as indicated at 90 in FIGS. 3 and 4 are well known in the art and can be provided in a variety of ways. These electronic switches 90 have three contacts 90a, 90b and 90c, the contact 90a serving as the moving contact of the switch, while the contacts 90b and 90c are fixed contacts. Switching takes place in response to pulses applied to the electronic switches 90 from the pulse generator 36. The electronic switches 90 are designed so that when a pulse is present at the pulse generator 36, the contacts 90a and 90b are closed and the terminals 90a and 90c open, and when no pulse is present at the pulse generator 36 the opposite occurs with the contacts 90a and 90c closed and the contacts 90a and 90b open.

It will now be evident from FIGS. 3 and 4, that for the duration of each pulse from the pulse generator 36 when the gate 12 is open, the electronic switches 90 permit the separating circuitry and distortion networks to effectively appear in the transmitter portion of the system to achieve the desired delay or frequency separation in the radiated pulses. When the pulse from the pulse generator 36 disappears, the separating circuitry and distortion networks effectively appear in the receiver portion of the system to convert the pulses to the same basis for application to the inputs of the multiplier 26.

It is to be understood in connection with the systems described herein that the electronic circuitry and devices designated in block form in the figures of the drawing are all of a type which can readily be provided by those skilled in the art. Since the present invention resides chiefly in the combination of these electronic devices and circuitry and not in the design of any particular one thereof, the details of these devices and circuitry will not be given. However, based upon the description and operation of the various systems provided herein, those skilled in the art will have no difficulty in practicing the invention.

It is also to be understood that the invention is not limited to the embodiments described and illustrated herein, since many modifications and variations in the construction and arrangement thereof may be made without departing from the scope of the invention as defined in the appended claims.

We claim as our invention:

1. A distance measuring system comprising a source of non-periodic energy, gating means to which the output of said source is fed, a pulse generator for opening said gating means for a predetermined amount of time, a timer initiated by the output from said pulse generator, means for dividing the output pulse from said gating means into two portions, means for delaying one portion by a predetermined amount with respect to the other portion, the amount of delay being sufficient to make the pulses uncorrelated, means for radiating to a target the two uncorrelated pulses of non-periodic energy so formed, means for receiving the pulses after reflection from the target, means for delaying the received pulses with respect to one another so that the pulses are brought back into correlation, a multiplier to which the correlated received pulses are fed, an integrator to which the output of said multiplier is fed, the integrated output from said integrator being fed to stop said timer, and means connected to said timer for providing an indication of target distance.

2. The invention in accordance with claim 1 wherein electronic switch means are provided to permit the means for delaying prior to radiating to also be used as the means for delaying after receiving.

3. A distance measuring system comprising a source of non-periodic energy, means to which the output of said source is fed for restricting the bandwidth of said energy to a predetermined band, gating means to which the restricted band non-periodic energy is fed, a pulse generator for opening said gating means for a predetermined amount of time, a timer initiated by the output from said pulse generator, means for dividing the output pulse from said gating means into two portions, means for heterodyning one portion to a non-overlapping frequency band, means for radiating to a target the two non-overlapping band pulses of non-periodic energy so formed, means for receiving the pulses after reflection from the target, means for separating and heterodying at least one of the received pulses so that the two pulses are brought to the same frequency band, a multiplier to which the two separated received pulses in the same frequency band are fed, an integrator to which the output of said multiplier is fed, the integrated output from said integrator being fed to stop said timer, and means connected to said timer for providing an indication of target distance.

4. A system for measuring the distance to a target comprising means for generating a wide band energy signal, means for transmitting wide band energy to the target, means for repetitively gating a time portion of the output of said generating means to said transmitting means, means connecting said gating means to said transmitting means for deriving a pulse which is uncorrelated to a preselected degree with the output of said gating means, means for receiving a wide band of energy from the target, means responsive to said receiving means for producing a pulse when the received energy contains signals which are uncorrelated to the preselected degree, and means for measuring the time duration between the output of said gating means and the output of said pulse producing means, said pulse deriving means comprising a time delay network and a frequency distortion network and said pulse producing means comprising a time delay network and a frequency distortion network, said time delay networks introducing time delays of substantially equal duration and said frequency distortion networks introducing substantially the same amount of distortion.

5. A system for measuring the distance to a target comprising means for generating a wide band energy signal, means for transmitting wide band energy to the target, means for repetitively gating a time portion of the output of said generating means to said transmitting means, means connecting said gating means to said transmitting means for deriving a pulse which is uncorrelated to a preselected degree with the output of said gating means, means for receiving a wide band of energy from the target, means responsive to said receiving means for producing a pulse when the received energy contains signals which are uncorrelated to the preselected degree, and means for measuring the time duration between the output of said gating means and the output of said pulse producing means, said pulse deriving means comprising a local oscillator, means for mixing the output of said oscillator with the output of said gating means, and a frequency distortion network, and said pulse producing means comprises means for mixing the output of said oscillator with the output of said receiving means and a second frequency distortion network, said frequency distortion networks introducing substantially the same amount of distortion.

6. A system for measuring the distance to a target comprising means for generating a wide band energy signal, said wide band energy generating means comprising means for generating a noise signal and a bandpass filter responsively connected to said noise generating means, means for transmitting said wide band energy to the target, means for repetitively gating a time portion of the ouput of said generating means to said transmitting means, means connecting said gating means to said transmitting means for deriving a pulse which is uncorrelated to a preselected degree with the output of said gating means, means for receiving a wide band of energy from the target, means responsive to said receiving means for producing a pulse when the received energy contains signals which are uncorrelated to the preselected degree, and means for measuring the time duration between the output of said gating means and the output of said pulse producing means.

7. A system for measuring the distance to a target comprising means for generating a wide band energy signal, means for transmitting wide band energy to the target, means for repetitively gating a time portion of the output of said generating means to said transmitting means, means connecting said gating means to said transmitting means for deriving a pulse which is uncorrelated to a preselected degree for the output of said gating means, means for receiving a wide band of energy from the target, means responsive to said receiving means for producing a pulse when the received energy contains signals which are uncorrelated to the preselected degree, and means for measuring the time duration between the output of said gating means and the output of said pulse producing means, said pulse producing means comprising means for recorrelating the received signal to the preselected degree, means for multiplying the recorrelated signals by one another, means for integrating the output of said multiplying means, and means responsive to said integrating means for generating a pulse only when the level of the output of said integrating means exceeds a predetermined amplitude.

References Cited by the Examiner
UNITED STATES PATENTS

| | | | |
|---|---|---|---|
| 2,676,317 | 4/54 | Purington | 343—18 |
| 2,768,372 | 10/56 | Green | 343—13 |
| 2,814,036 | 11/57 | Philpott | 343—13 |
| 2,857,592 | 10/58 | Hoffman | 343—13 |
| 3,017,630 | 1/62 | Begovich et al. | 343—16 X |

CHESTER L. JUSTUS, *Primary Examiner.*

FREDERICK M. STRADER, *Examiner.*